United States Patent
Li et al.

(10) Patent No.: US 10,474,522 B2
(45) Date of Patent: *Nov. 12, 2019

(54) PROVIDING A NETWORK ACCESS FAILURE CAUSE VALUE OF A USER EQUIPMENT

(71) Applicant: Huawei Technologies Co., Ltd., Shenzhen (CN)

(72) Inventors: Yan Li, Beijing (CN); Wenfu Wu, Shanghai (CN); Kai Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

This patent is subject to a terminal disclaimer.

(21) Appl. No.: 15/691,033

(22) Filed: Aug. 30, 2017

(65) Prior Publication Data

US 2017/0364405 A1    Dec. 21, 2017

Related U.S. Application Data

(63) Continuation of application No. 14/616,094, filed on Feb. 6, 2015, now Pat. No. 9,766,967, which is a continuation of application No. PCT/CN2012/079814, filed on Aug. 8, 2012.

(51) Int. Cl.
*G06F 11/07* (2006.01)
*H04W 24/04* (2009.01)

(52) U.S. Cl.
CPC .......... *G06F 11/079* (2013.01); *H04W 24/04* (2013.01)

(58) Field of Classification Search
CPC ... G06F 11/0709; G06F 11/079; H04W 24/04
See application file for complete search history.

(56) References Cited

U.S. PATENT DOCUMENTS

| 7,733,767 B2 | 6/2010 | Granath |
| 2005/0129029 A1 | 6/2005 | Creamer et al. |
| 2006/0126584 A1 | 6/2006 | Zhang et al. |

(Continued)

FOREIGN PATENT DOCUMENTS

| CN | 101188860 A | 5/2008 |
| CN | 101511076 A | 8/2009 |

(Continued)

*Primary Examiner* — Joseph R Kudirka
(74) *Attorney, Agent, or Firm* — Leydig, Voit & Mayer, Ltd.

(57) ABSTRACT

Embodiments of the present disclosure provide an information processing method and apparatus. The method comprises: sending a first message to a first equipment, wherein the first message is used for requesting user data of a user equipment; receiving a second message sent by the first equipment according to the first message, wherein the second message carries the user data of the user equipment and a network access failure transmission indication; and when determining a network access failure of the user equipment, sending a network access failure cause value of the user equipment to a storing user subscribed information entity or a failure cause processing entity according to the network access failure transmission indication. The information processing method and apparatus provided by the embodiments of the present disclosure may be used for achieving a failure diagnosis of the user equipment.

22 Claims, 13 Drawing Sheets

(56) References Cited

U.S. PATENT DOCUMENTS

2010/0029248 A1    2/2010   Shi et al.
2013/0148492 A1    6/2013   Liao et al.

FOREIGN PATENT DOCUMENTS

| CN | 101541062 A | 9/2009 |
|----|-------------|--------|
| CN | 102083171 A | 6/2011 |
| CN | 102421099 A | 4/2012 |
| CN | 102448063 A | 5/2012 |
| EP | 2410701 A1  | 1/2012 |
| EP | 2424160 A1  | 2/2012 |

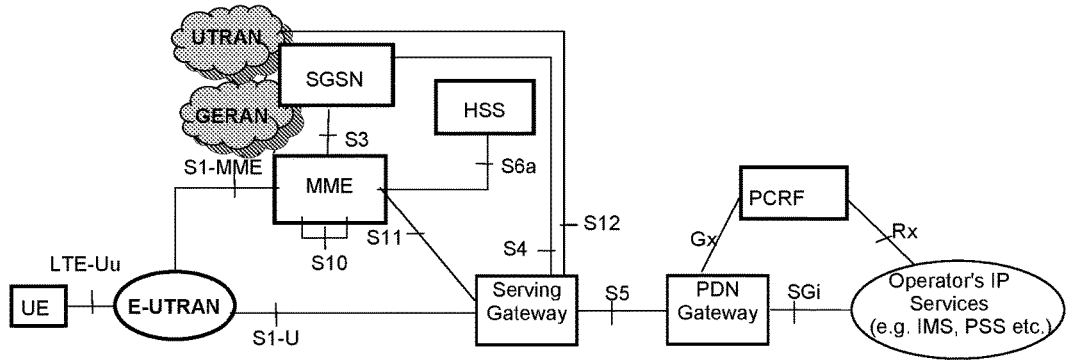

Fig. 1

100 sending a first message to a first equipment, wherein the first message is used for requesting user data of a user equipment — S110 receiving a second message sent by the first equipment according to the first message, wherein the second message carries the user data of the user equipment and a network access failure transmission indication — S120 when determining a network access failure of the user equipment, sending a network access failure cause value of the user equipment to a home subscriber server HSS or a failure cause processing entity according to the network access failure transmission indication — S130

S210 — receiving a first message sent by an access control network element of a user equipment, wherein the first message is used for requesting user data of the user equipment S220 — sending a second message to the access control network element of the user equipment according to the first message, wherein the second message carries the user data of the user equipment and a network access failure transmission indication, for enabling the access control network element of the user equipment to send a network access failure cause value of the user equipment to a home subscriber server HSS or a failure cause processing entity when determining a network access failure of the user equipment

S310 — receiving a network access failure cause value of a user equipment sent by a home subscriber server HSS or an access control network element of the user equipment S320 — diagnosing a failure of the user equipment according to the network access failure cause value of the user equipment

Fig. 4

PROVIDING A NETWORK ACCESS FAILURE CAUSE VALUE OF A USER EQUIPMENT

CROSS-REFERENCE TO RELATED APPLICATIONS

This application is a continuation of U.S. patent application Ser. No. 14/616,094, U.S. Pat. No. 9,766,967 B2, filed on Feb. 6, 2015, which is a continuation of International Application No. PCT/CN2012/079814, filed on Aug. 8, 2012. All of the afore-mentioned patent applications are hereby incorporated by reference in their entireties.

TECHNICAL FIELD

The present disclosure relates to the field of communications, and particularly, to information processing methods and apparatus. The information processing apparatus includes an access control network element, a home subscriber server and a failure cause processing entity.

BACKGROUND

We may see from the prior art that, an existing mobile network will not record a failure cause in the case of a user attachment or access failure. For example, for machine to machine (referred to as the "M2M") communication services, after an M2M terminal attachment fails, an M2M application manager could not be notified of an M2M terminal network access failure and a failure cause value. Meanwhile, since the network itself does not record the terminal access failure cause value, an M2M application could not acquire the terminal network access failure cause value and perform a corresponding processing. For example, some applications may limit that a terminal could only be accessed to the network at a limited location, after the terminal is accessed from other locations, an access control network element will reject the terminal access according to a subscribed data check. If an application server is able to acquire the failure cause as entering a limited region, it indicates that the terminal has been moved, then the application server may judge that the terminal may be moved illegally. However, the above-mentioned requirements could not be satisfied in the prior art.

SUMMARY

Embodiments of the present disclosure provide information processing methods and apparatus, which may be used for acquiring a network access failure cause value of a user equipment and achieving a failure diagnosis of the user equipment.

In a first aspect, an information processing method is provided, including: sending a first message to a first equipment, wherein the first message is used for requesting user data of a user equipment;

receiving a second message sent by the first equipment according to the first message, wherein the second message carries the user data of the user equipment and a network access failure transmission indication;

when determining a network access failure of the user equipment, sending a network access failure cause value of the user equipment to a home subscriber server HSS or a failure cause processing entity according to the network access failure transmission indication.

In combination with the first aspect, in a first possible implementation manner of the first aspect, the first equipment is the HSS or a source access control network element of the user equipment;

wherein when the first equipment is the source access control network element of the user equipment, the network access transmission indication is sent by the HSS to the source access control network element when the source access control network element requests the user data of the user equipment from the HSS.

In combination with the first aspect or the first possible implementation manner of the first aspect, in a second possible implementation manner of the first aspect, the network access failure is an attachment failure or a packet data network PDN connection establishment failure.

In combination with the second possible implementation manner of the first aspect, in a third possible implementation manner of the first aspect, before sending the network access failure cause value of the user equipment to the HSS or the failure cause processing entity, the method further comprises:

receiving a third message sent by a packet data gateway, wherein the third message is used for indicating the PDN connection establishment failure of the user equipment, and the third message carries the network access failure cause value.

In combination with the second possible implementation manner of the first aspect, in a fourth possible implementation manner of the first aspect, when the first equipment is a source access control network element of the user equipment, before sending the network access failure cause value of the user equipment to the HSS or the failure cause processing entity, the method further comprises:

determining whether the user equipment is allowed to complete a location update according to the user data;

when determining that the user equipment is not allowed to complete the location update, determining whether a cause why the user equipment is not allowed to complete the location update belongs to causes resulting in an attachment failure;

when determining that the cause why the user equipment is not allowed to complete the location update belongs to the causes resulting in the attachment failure, determining the attachment failure of the user equipment.

In combination with the first aspect, the first possible implementation manner of the first aspect, the second possible implementation manner of the first aspect, the third possible implementation manner of the first aspect or the fourth possible implementation manner of the first aspect, in a fifth possible implementation manner of the first aspect, the failure cause processing entity is an application server, an ability opening platform of an operator or a machine type communications-interworking function MTC-IWF.

In a second aspect, an information processing method is provided, including: receiving a first message sent by an access control network element of a user equipment, wherein the first message is used for requesting user data of the user equipment;

sending a second message to the access control network element of the user equipment according to the first message, wherein the second message carries the user data of the user equipment and a network access failure transmission indication, for enabling the access control network element of the user equipment to send a network access failure cause value of the user equipment to a home subscriber server HSS or a failure cause processing entity when determining a network access failure of the user equipment.

In combination with the second aspect, in a first possible implementation manner of the second aspect, before receiving the first message sent by the access control network element of the user equipment, the method further comprises:

receiving an indication information sent by the failure cause processing entity, wherein the indication information is used for indicating to send the network access failure transmission indication to the access control network element of the user equipment.

In combination with the second aspect or the first possible implementation manner of the second aspect, in a second possible implementation manner of the second aspect, the method further includes:

receiving the network access failure cause value of the user equipment, sent by the access control network element of the user equipment;

sending the network access failure cause value of the user equipment to the failure cause processing entity.

In combination with the second possible implementation manner of the second aspect, in a third possible implementation manner of the second aspect, the sending the network access failure cause value of the user equipment to the failure cause processing entity, comprises:

receiving an inquiry request sent by the failure cause processing entity, wherein the inquiry request is used for requesting to inquire the network access failure cause value of the user equipment, and sending the network access failure cause value of the user equipment to the failure cause processing entity according to the inquiry request; or, when the method further comprises receiving the indication information sent by the failure cause processing entity, the sending the network access failure cause value of the user equipment to the failure cause processing entity, comprises:

sending the network access failure cause value of the user equipment to the failure cause processing entity according to the indication information, wherein the indication information is further used for indicating to send the network access failure cause value of the user equipment to the failure cause processing entity when receiving the network access failure cause value of the user equipment.

In combination with the second aspect, the first possible implementation manner of the second aspect, the second possible implementation manner of the second aspect or the third possible implementation manner of the second aspect, in a fourth possible implementation manner of the second aspect, an access control entity of the user equipment is a mobility management entity MME, a serving general packet radio service support node SGSN or an authentication, authorization and accounting AAA; the failure cause processing entity is an application server, an ability opening platform of an operator or a machine type communications-interworking function MTC-IWF.

In a third aspect, an information processing method is provided, including: receiving a network access failure cause value of a user equipment sent by a home subscriber server HSS or an access control network element of the user equipment;

diagnosing a failure of the user equipment according to the network access failure cause value of the user equipment.

In combination with the third aspect, in a first possible implementation manner of the third aspect, before receiving the network access failure cause value of the user equipment sent by the HSS or the access control network element of the user equipment, the method further comprises:

sending an indication information to the HSS, wherein the indication information is used for indicating the HSS to send the network access failure transmission indication corresponding to the user equipment to the access control network element of the user equipment, for enabling the access control network element of the user equipment to send the network access failure cause value of the user equipment to the HSS or a failure cause processing entity when determining a network access failure of the user equipment.

In combination with the first possible implementation manner of the third aspect, in a second possible implementation manner of the third aspect, the indication information is further used for indicating the HSS to send the network access failure cause value of the user equipment to the failure cause processing entity when the network access failure cause value of the user equipment is received.

In combination with the third aspect, the first possible implementation manner of the third aspect or the second possible implementation manner of the third aspect, in a third possible implementation manner of the third aspect, before receiving the network access failure cause value of the user equipment sent by the HSS, the method further comprises:

sending an inquiry request to the HSS, wherein the inquiry request is used for requesting to inquire the network access failure cause value of the user equipment.

In combination with the third aspect, the first possible implementation manner of the third aspect, the second possible implementation manner of the third aspect or the third possible implementation manner of the third aspect, in a fourth possible implementation manner of the third aspect, the network access failure is an attachment failure or a packet data network PDN connection establishment failure.

In combination with the third aspect, the first possible implementation manner of the third aspect, the second possible implementation manner of the third aspect, the third possible implementation manner of the third aspect or the fourth possible implementation manner of the third aspect, in a fifth possible implementation manner of the third aspect, an access control entity of the user equipment is a mobility management entity MME, a serving general packet radio service support node SGSN or an authentication, authorization and accounting AAA.

In a fourth aspect, an access control network element is provided, including:

a first sending unit, configured to send a first message to a first equipment, wherein the first message is used for requesting user data of a user equipment;

a first receiving unit, configured to receive a second message sent by the first equipment according to the first message, wherein the second message carries the user data of the user equipment and a network access failure transmission indication;

a second sending unit, configured to, when determining a network access failure of the user equipment, send a network access failure cause value of the user equipment to a home subscriber server HSS or a failure cause processing entity according to the network access failure transmission indication.

In combination with the fourth aspect, in a first possible implementation manner of the fourth aspect, the first equipment is the HSS or a source access control network element of the user equipment;

wherein when the first equipment is the source access control network element of the user equipment, the network access transmission indication is sent by the HSS to the source access control network element when the source access control network element requests the user data of the user equipment from the HSS.

In combination with the fourth aspect or the first possible implementation manner of the fourth aspect, in a second possible implementation manner of the fourth aspect, the network access failure is an attachment failure or a packet data network PDN connection establishment failure.

In combination with the second possible implementation manner of the fourth aspect, in a third possible implementation manner of the fourth aspect, the access control network element further includes:

a second receiving unit, configured to receive a third message sent by a packet data gateway, wherein the third message is used for indicating the PDN connection establishment failure of the user equipment, and the third message carries the network access failure cause value.

In combination with the second possible implementation manner of the fourth aspect, in a fourth possible implementation manner of the fourth aspect, the access control network element further includes:

a first determining unit, configured to determine whether the user equipment is allowed to complete a location update according to the user data;

a second determining unit, configured to, when determining that the user equipment is not allowed to complete the location update, determine whether a cause why the user equipment is not allowed to complete the location update belongs to causes resulting in an attachment failure;

a third determining unit, configured to, when determining that the cause why the user equipment is not allowed to complete the location update belongs to the causes resulting in the attachment failure, determine the attachment failure of the user equipment.

In combination with the fourth aspect, the first possible implementation manner of the fourth aspect, the second possible implementation manner of the fourth aspect, the third possible implementation manner or the fourth aspect or the fourth possible implementation manner of the fourth aspect, in a fifth possible implementation manner of the fourth aspect, the failure cause processing entity is an application server, an ability opening platform of an operator or a machine type communications-interworking function MTC-IWF.

In a fifth aspect, a home subscriber server HSS is provided, including:

a first receiving unit, configured to receive a first message sent by an access control network element of a user equipment, wherein the first message is used for requesting user data of the user equipment;

a first sending unit, configured to send a second message to the access control network element of the user equipment according to the first message, wherein the second message carries the user data of the user equipment and a network access failure transmission indication, for enabling the access control network element of the user equipment to send a network access failure cause value of the user equipment to the home subscriber server HSS or a failure cause processing entity when determining a network access failure of the user equipment.

In combination with the fifth aspect, in a first possible implementation manner of the fifth aspect, the HSS further includes:

a second receiving unit, configured to receive an indication information sent by the failure cause processing entity, wherein the indication information is used for indicating to send the network access failure transmission indication to the access control network element of the user equipment.

In combination with the fifth aspect or the first possible implementation manner of the fifth aspect, in a second possible implementation manner of the fifth aspect, the HSS further includes:

a third receiving unit, configured to receive the network access failure cause value of the user equipment, sent by the access control network element of the user equipment;

a second sending unit, configured to send the network access failure cause value of the user equipment to the failure cause processing entity.

In combination with the second possible implementation manner of the fifth aspect, in a third possible implementation manner of the fifth aspect, the HSS further includes a fourth receiving unit, configured to receive an inquiry request sent by the failure cause processing entity, wherein the inquiry request is used for requesting to inquire the network access failure cause value of the user equipment, and the second sending unit is specifically configured to send the network access failure cause value of the user equipment to the failure cause processing entity according to the inquiry request; or, when the HSS further includes the second receiving unit configured to receive the indication information sent by the failure cause processing entity and used for indicating to send the network access failure transmission indication to the access control network element of the user equipment, the second sending unit is specifically configured to send the network access failure cause value of the user equipment to the failure cause processing entity according to the indication information, wherein the indication information is further used for indicating to send the network access failure cause value of the user equipment to the failure cause processing entity when receiving the network access failure cause value of the user equipment.

In combination with the fifth aspect, the first possible implementation manner of the fifth aspect, the second possible implementation manner of the fifth aspect or the third possible implementation manner of the fifth aspect, in a fourth possible implementation manner of the fifth aspect, an access control entity of the user equipment is a mobility management entity MME, a serving general packet radio service support node SGSN or an authentication, authorization and accounting AAA; the failure cause processing entity is an application server, an ability opening platform of an operator or a machine type communications-interworking function MTC-IWF.

In a sixth aspect, a failure cause processing entity is provided, including:

a receiving unit, configured to receive a network access failure cause value of a user equipment sent by a home subscriber server HSS or an access control network element of the user equipment;

a diagnosing unit, configured to a diagnose the failure of the user equipment according to the network access failure cause value of the user equipment.

In combination with the sixth aspect, in a first possible implementation manner of the sixth aspect, the failure cause processing entity further includes:

a first sending unit, configured to send an indication information to the HSS, wherein the indication information is used for indicating the HSS to send the network access failure transmission indication corresponding to the user equipment to the access control network element of the user equipment, for enabling the access control network element of the user equipment to send the network access failure cause value of the user equipment to the HSS or the failure cause processing entity when determining a network access failure of the user equipment.

In combination with the first possible implementation manner of the sixth aspect, in a second possible implementation manner of the sixth aspect, the indication information is further used for indicating the HSS to send the network access failure cause value of the user equipment to the failure cause processing entity when receiving the network access failure cause value of the user equipment.

In combination with the sixth aspect, the first possible implementation manner of the sixth aspect or the second possible implementation manner of the sixth aspect, in a third possible implementation manner of the sixth aspect, the failure cause processing entity further includes:

a second sending unit, configured to send an inquiry request to the HSS, wherein the inquiry request is used for requesting to inquire the network access failure cause value of the user equipment.

In combination with the sixth aspect, the first possible implementation manner of the sixth aspect, the second possible implementation manner of the sixth aspect or the third possible implementation manner of the sixth aspect, in a fourth possible implementation manner of the sixth aspect, the network access failure is an attachment failure or a packet data network PDN connection establishment failure.

In combination with the sixth aspect, the first possible implementation manner of the sixth aspect, the second possible implementation manner of the sixth aspect, the third possible implementation manner of the sixth aspect or the fourth possible implementation manner of the sixth aspect, in a fifth possible implementation manner of the sixth aspect, an access control entity of the user equipment is a mobility management entity MME, a serving general packet radio service support node SGSN or an authentication, authorization and accounting AAA; the failure cause processing entity is an application server, an ability opening platform of an operator or a machine type communications-interworking function MTC-IWF.

Based on the above-mentioned technical solutions, the information processing methods and apparatus of the embodiments of the present disclosure may be used for achieving a failure diagnosis of the user equipment, by sending the first message to the first equipment, receiving the second message carrying the network access failure transmission indication and sent by the first equipment according to the first message, and when determining the network access failure of the user equipment, sending the network access failure cause value of the user equipment to the HSS or the failure cause processing entity according to the network access failure transmission indication.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 1 shows an evolved network architecture diagram of a current radio network.

FIG. 2 shows a schematic flowchart of an information processing method according to an embodiment of the present disclosure.

FIG. 3 shows a schematic flowchart of an information processing method according to another embodiment of the present disclosure.

FIG. 4 shows a schematic flowchart of an information processing method according to another embodiment of the present disclosure.

DESCRIPTION OF EMBODIMENTS

Figure 5:
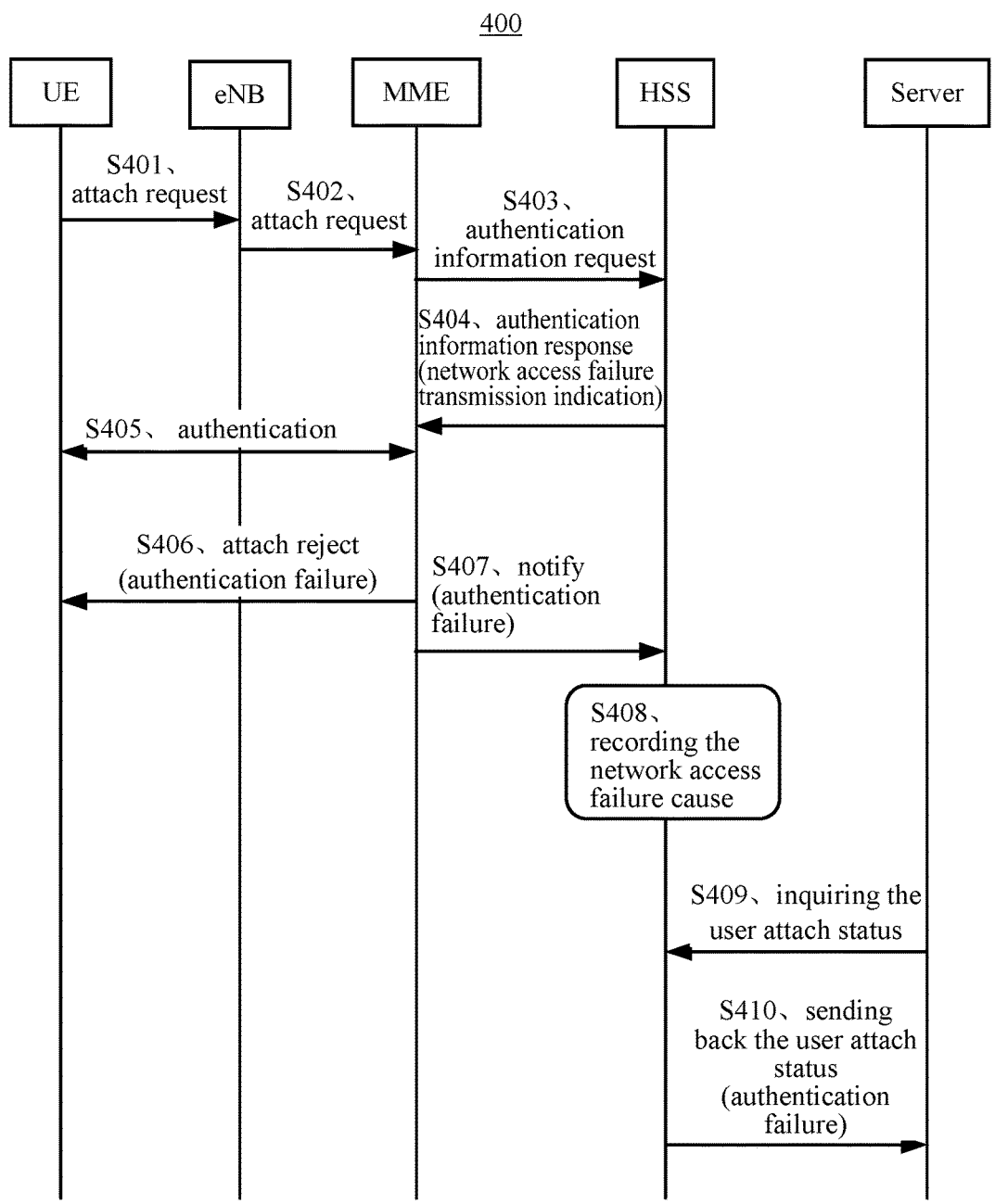
FIG. 5 shows a schematic flowchart of an information processing method according to another embodiment of the present disclosure.

A clear and complete description of technical solutions in the embodiments of the present disclosure will be given below, in combination with the accompanying drawings in the embodiments of the present disclosure. Apparently, the embodiments described are merely a part, but not all, of the embodiments of the present disclosure. All of other embodiments, obtained by those of ordinary skill in the art based on the embodiments of the present disclosure without any creative effort, fall into the protection scope of the present disclosure.

It should be understood that, the technical solutions of the embodiments of the present disclosure may be applied to various communication systems, for example, a global system of mobile communication (Global System of Mobile communication, referred to as "GSM") system, a code division multiple access (Code Division Multiple Access, referred to as "CDMA") system, a wideband code division multiple access (Wideband Code Division Multiple Access, referred to as "WCDMA") system, a general packet radio service (General Packet Radio Service, referred to as the "GPRS"), a long term evolution (Long Term Evolution, referred to as "LTE") system, an LTE frequency division duplex (Frequency Division Duplex, referred to as "FDD") system, an LTE time division duplex (Time Division Duplex, referred to as "TDD"), a universal mobile telecommunication system (Universal Mobile Telecommunication System, referred to as "UMTS") and the like.

A user equipment (User Equipment, referred to as "UE") and a mobile terminal (Mobile Terminal) may also be called a user, a mobile user equipment and the like. The use equipment may communicate with one or multiple core networks through a radio access network (e.g., Radio Access Network, referred to as "RAN"). The user may be a mobile terminal, for example, a mobile telephone (or called a "cellular" telephone) and a computer having a mobile terminal. For example, the mobile terminal may be a portable, pocket-sized, hand-held, computer inbuilt or vehicle-mounted mobile device, which exchanges voice and/or data with the radio access network.

A base station may be a base transceiver station (Base Transceiver Station, referred to as "BTS") in the global system of mobile communication (Global System of Mobile communication, referred to as "GSM") or the CDMA, may also be a base station (NodeB) in the WCDMA, and may also be an evolutional Node B (evolutional Node B, referred to as "eNB or e-NodeB" in the LTE.

To understand the present disclosure more clearly, one of applicable scenarios of the embodiments of the present disclosure, an evolved packet system (Evolved Packet System, referred to as "EPS"), will be described below in combination with FIG. 1.

As shown in FIG. 1, a core network of a radio evolved network mainly includes a mobility management entity (Mobility Management Entity, referred to as "MME"), a serving general packet radio service support node (Serving General Packet Radio Service Support Node, referred to as "SGSN"), a serving gateway (Serving Gateway referred to as "SGW"), a packet data network gateway (Packet Data Network Gateway, referred to as "PGW"), a policy and charging rule function (Policy and Charging rule function, referred to as "PCRF"), a home subscriber server (Home Subscriber Server, referred to as "HSS") and other logic function bodies. Wherein, the SGSN/MME is a mobility management network element, the SGSN is responsible for such functions as non-access layer (Non-Access Layer, referred to as "NAS") signaling processing, roaming, tracking and the like when UE is accessed from a universal terrestrial radio access network (Universal Terrestrial Radio Access Network, referred to as "UTRAN") or an Evolved Universal Terrestrial Radio Access Network, referred to as "GERAN"), and the MME is responsible for such functions as NAS signaling processing, roaming, tracking and the like when the UE is accessed from the EUTRAN. The SGW is responsible for local data aggregation anchor and packet routing and forwarding functions of a third generation partnership project (Third Generation Partnership Project, referred to as "3GPP") network; the PGW is responsible for an anchor function between 3GPP and non-3GPP networks and a user IP address allocation function. The HSS is a home subscriber server, and is used for storing user subscribed information, security context and other information and for authentication and authorization of users. For simplicity, other function entities are not introduced.

With the development of mobile wideband networks, the EPS network not only provides human to human (Human to Human, referred to as "H2H") communication services, but also begins to provide machine type communication (Machine Type Communication, referred to as the "MTC") services, namely, M2M communication services, such as traffic control and management, factory monitoring, electronic meter reading, intelligent measurement, cargo tracking, smart home and other application fields.

It should be noted that the descriptions above are merely one of the applicable scenarios of the embodiments of the present disclosure, and the embodiments of the present disclosure may also be applied to other scenarios.

FIG. 2 is a schematic flowchart of an information processing method 100 according to an embodiment of the present disclosure. Wherein, the method 100 may be implemented by an access control network element, for example, an MME, an SGSN and a 3GPP authentication, authorization and accounting (Authentication, Authorization and Accounting, referred to as "AAA"). As shown in FIG. 2, the method 100 includes:

S110, a first message is sent to a first equipment, wherein the first message is used for requesting user data of a user equipment;

S120, a second message sent by the first equipment according to the first message is received, wherein the second message carries the user data of the user equipment and a network access failure transmission indication;

S130, when a network access failure of the user equipment is determined, a network access failure cause value of the user equipment is sent to an HSS or a failure cause processing entity according to the network access failure transmission indication.

In the embodiment of the present disclosure, the first equipment may be the HSS, the first message may be a message used for requesting subscribed data of the user equipment from the HSS, may also be a message used for requesting authentication data of the user equipment from the HSS and may also be another message, and this is not limited in the embodiment of the present disclosure.

In the embodiment of the present disclosure, the first equipment may also be a source access control network element of the user equipment, wherein the network access transmission indication sent by the source access control network element of the user equipment through the second message is sent by the HSS to the source access control network element of the user equipment when the source access control network element of the user equipment requests the user data of the user equipment from the HSS.

In the embodiment of the present disclosure, the network access failure of the user equipment may be an attachment failure, for example, an authentication failure, a subscribed data check failure and the like; may also be a packet data network (Packet Data Network, referred to as "PDN") connection establishment failure, for example, an access point name (Access Point Name, referred to as "APN") congestion, an internet protocol (Internet Protocol, referred to as "IP") address allocation insufficiency and the like. Then, in the embodiment of the present disclosure, the network access failure cause value of the user equipment may be the attachment failure, the authentication failure, the subscribed data check failure, the PDN connection establishment failure, the APN congestion or the IP address allocation insufficiency and the like, and of course may be another cause value, and this is not limited in the embodiment of the present disclosure.

In the embodiment of the present disclosure, before S130 in which a network access failure cause value of the user equipment is sent to an HSS or a failure cause processing entity, the method 100 may further include:

a third message sent by a PGW is received, wherein the third message is used for indicating the PDN connection establishment failure of the user equipment, and the third message carries the network access failure cause value.

For example, in a 3GPP network, after receiving a session creation request sent by the access control network element, and if determining that the user equipment is not allowed to be accessed to a packet data network, the PGW may send a session creation response message (namely, the third message of the embodiment of the present disclosure) to the MME, wherein the session creation response message carries the network access failure cause value of the user equipment, for example, the APN congestion, the IP address allocation insufficiency and the like. As another example, in a non-3GPP network, when determining that the PDN connection of the user equipment is not established, for example, due to such causes as the APN congestion, the IP address allocation insufficiency and the like, the PGW sends a session release message to the 3GPP authentication, authorization and accounting (Authentication, Authorization and Accounting, referred to as "AAA"), wherein the session release message carries a release cause (namely, the network access failure cause value). After receiving the session release message sent by the PGW, the 3GPP AAA sends the network access failure cause value carried in the message to the HSS or the failure cause processing entity.

In the embodiment of the present disclosure, when the first equipment is the source access control network element of the user equipment, before S130 in which a network access failure cause value of the user equipment is sent to an HSS or a failure cause processing entity, the method 100 may further include:

whether the user equipment is allowed to complete a location update is determined according to the user data;

when it is determined that the user equipment is not allowed to complete the location update, whether a cause why the user equipment is not allowed to complete the location update belongs to causes resulting in an attachment failure is determined;

when it is determined that the cause why the user equipment is not allowed to complete the location update belongs to the causes resulting in the attachment failure, the attachment failure of the user equipment is determined.

In the embodiment of the present disclosure, the failure cause processing entity may be an application server, an ability opening platform of an operator or a machine type communications-interworking function (Machine Type Communications-InterWorking Function, referred to as "MTC-IWF"). An access control entity of the user equipment may be the MME, the SGSN or the AAA.

Therefore, the information processing method of the embodiment of the present disclosure may be used for achieving a failure diagnosis of the user equipment, by sending the first message to the first equipment, receiving the second message carrying the network access failure transmission indication and sent by the first equipment according to the first message, and when determining the network access failure of the user equipment, sending the network access failure cause value of the user equipment to the HSS or the failure cause processing entity according to the network access failure transmission indication.

The schematic flowchart of the information processing method according to the embodiment of the present disclosure has been described above from an access control network element side in combination with FIG. 2. The schematic flowchart of the information processing method according to the embodiment of the present disclosure will be described below from an HSS side in combination with FIG. 3.

FIG. 3 is a schematic flowchart of an information processing method 200 according to an embodiment of the present disclosure. The method may be implemented by an HSS. As shown in FIG. 3, the method 200 includes:

S210, a first message sent by an access control network element of a user equipment is received, wherein the first message is used for requesting user data of the user equipment;

S220, a second message is sent to the access control network element of the user equipment according to the first message, wherein the second message carries the user data of the user equipment and a network access failure transmission indication, for enabling the access control network element of the user equipment to send a network access failure cause value of the user equipment to the HSS or a failure cause processing entity when network access failure of the user equipment is determined.

In the embodiment of the present disclosure, before S210 in which a first message sent by an access control network element of a user equipment is received, the method 200 may further include:

an indication information sent by the failure cause processing entity is received, wherein the indication information is used for indicating to send the network access failure transmission indication to the access control network element of the user equipment.

Specifically, when needing to acquire the network access failure cause value of the user equipment, the failure cause processing entity may send the indication information to the HSS, wherein the indication information is used for indicating to send the network access failure transmission indication to the access control network element of the user equipment. When receiving the indication information sent by the failure cause processing entity, the HSS may add the failure cause transmission indication in the user data of the user equipment corresponding to the indication information and send the network access failure transmission indication to the access control network element of the user equipment with the user data after receiving the first indication information sent by the access control network element of the user equipment.

It should be noted that, in the embodiment of the present disclosure, after receiving the first message sent by the access control network element of the user equipment, the HSS may also send the network access failure transmission indication to the access control network element of the user equipment through the second message according to subscribed information.

In the embodiment of the present disclosure, the method 200 may further include:

the network access failure cause value of the user equipment, sent by the access control network element of the user equipment, is received;

the network access failure cause value of the user equipment is sent to the failure cause processing entity.

In the embodiment of the present disclosure, the network access failure cause value of the user equipment may be sent to the failure cause processing entity, including:

an inquiry request sent by the failure cause processing entity is received, wherein the inquiry request is used for requesting to inquire the network access failure cause value of the user equipment, and the network access failure cause value of the user equipment is sent to the failure cause processing entity according to the inquiry request.

For example, the failure cause processing entity may send the inquiry request to the HSS according to a certain time period, and may also send the inquiry request to the HSS after determining the network access failure of the user equipment, in order to acquire a specific network access failure cause value, such that the HSS sends the network access failure cause value of the user equipment to the failure cause processing entity after receiving the inquiry request sent by the failure cause processing entity.

Or, in the embodiment of the present disclosure, when the received indication information sent by the failure cause processing entity is not only used for indicating to send the network access failure transmission indication to the access control network element of the user equipment, but also used for indicating to send the network access failure cause value of the user equipment to the failure cause processing entity, the network access failure cause value of the user equipment may be sent to the failure cause processing entity, including:

the network access failure cause value of the user equipment is sent to the failure cause processing entity according to the indication information.

In the embodiment of the present disclosure, an access control entity of the user equipment may be an MME, an SGSN or an AAA; in the embodiment of the present disclosure, the failure cause processing entity may be an application server, an ability opening platform of an operator or an MTC-IWF.

Therefore, the information processing method of the embodiment of the present disclosure may be used for achieving a failure diagnosis of the user equipment, by receiving the first message sent by the access control network element of the user equipment, and sending the second message carrying the network access failure transmission indication, for enabling the access control network element of the user equipment to send the network access failure cause value of the user equipment to the HSS or the failure cause processing entity when the network access failure of the user equipment is determined.

The information processing method according to the embodiment of the present disclosure has been described above from the access control network element side and the HSS side in combination with FIG. 2 and FIG. 3, respectively. The information processing method according to the embodiment of the present disclosure will be described below from a failure cause processing entity side in combination with FIG. 4.

FIG. 4 is a schematic flowchart of an information processing method 300 according to an embodiment of the present disclosure. The method may be implemented by a failure cause processing entity, for example, an application server, an ability opening platform of an operator or an MTC-IWF. As shown in FIG. 4, the method 300 includes:

S310, a network access failure cause value of a user equipment sent by a home subscriber server HSS or an access control network element of the user equipment is received;

S320, the failure of the user equipment is diagnosed according to the network access failure cause value of the user equipment.

In the embodiment of the present disclosure, before S310 in which a network access failure cause value of a user equipment sent by an HSS or an access control network element of the user equipment is received, the method 300 may further include:

an indication information is sent to the HSS, wherein the indication information is used for indicating the HSS to send a network access failure transmission indication corresponding to the user equipment to the access control network element of the user equipment, for enabling the access control network element of the user equipment to send the network access failure cause value of the user equipment to the HSS or the failure cause processing entity when determining a network access failure of the user equipment.

In the embodiment of the present disclosure, the indication information is further used for indicating the HSS to send the network access failure cause value of the user equipment to the failure cause processing entity when receiving the network access failure cause value of the user equipment.

In the embodiment of the present disclosure, before the network access failure cause value of the user equipment sent by the HSS is received, the method further includes:

an inquiry request is sent to the HSS, wherein the inquiry request is used for requesting to inquire the network access failure cause value of the user equipment.

In the embodiment of the present disclosure, the network access failure is an attachment failure or a PDN connection establishment failure.

In the embodiment of the present disclosure, an access control entity of the user equipment is an MME, an SGSN or an AAA.

Therefore, the information processing method of the embodiment of the present disclosure may be used for achieving a failure diagnosis of the user equipment, by receiving the network access failure cause value of the user equipment sent by the home subscriber server HSS or the access control network element of the user equipment, and diagnosing a failure of the user equipment according to the network access failure cause value of the user equipment.

The information processing methods according to the embodiment of the present disclosure have been described above from the access control network element side, the HSS side and the failure cause processing entity side in combination with FIG. 2 to FIG. 4, respectively. The information processing method according to the embodiment of the present disclosure will be described below in an interactive manner in combination with FIG. 5 to FIG. 8.

FIG. 5 is a schematic flowchart of an information processing method 400 according to an embodiment of the present disclosure. As shown in FIG. 5, the method 400 includes:

S401, a user equipment sends an attach request to an eNB.

S402, the eNB forwards the attach request to an MME.

S403, due to the first attach, the MME has no security context of the user equipment, thus an authentication information request is sent to an HSS, wherein the request carries a user identifier, for example, an international mobile subscriber identification number (International Mobile Subscriber Identification Number, referred to as "IMSI").

S404, the HSS sends back the authentication information of the user equipment, and meanwhile sends back a network access failure transmission indication.

S405, the MME authenticates the user equipment according to the authentication information sent back.

S406, when determining the authentication failure of the user equipment, the MME sends back an attach reject to the user equipment, wherein a carried failure cause value is an authentication failure.

S407, since the HSS sends the network access failure transmission indication to the MME in S404, the MME sends a notify message to the HSS, wherein the notify message includes the network access failure cause value, namely, the authentication failure, and after sending back the message, the MME may delete the user context.

S408, the HSS records the network access failure cause value in the user data of the user equipment, for enabling a subsequent application server to inquire a user attach status from the HSS.

S409, the application server inquires the user attach status from the HSS, for example, may inquire according to a certain time period and may also inquire a specific failure cause value from the HSS when determining the attachment failure of the user equipment.

S410, the HSS sends back the attachment failure cause, namely, the authentication failure of the user equipment to the application server according to the recorded network access failure cause value.

Figure 6:
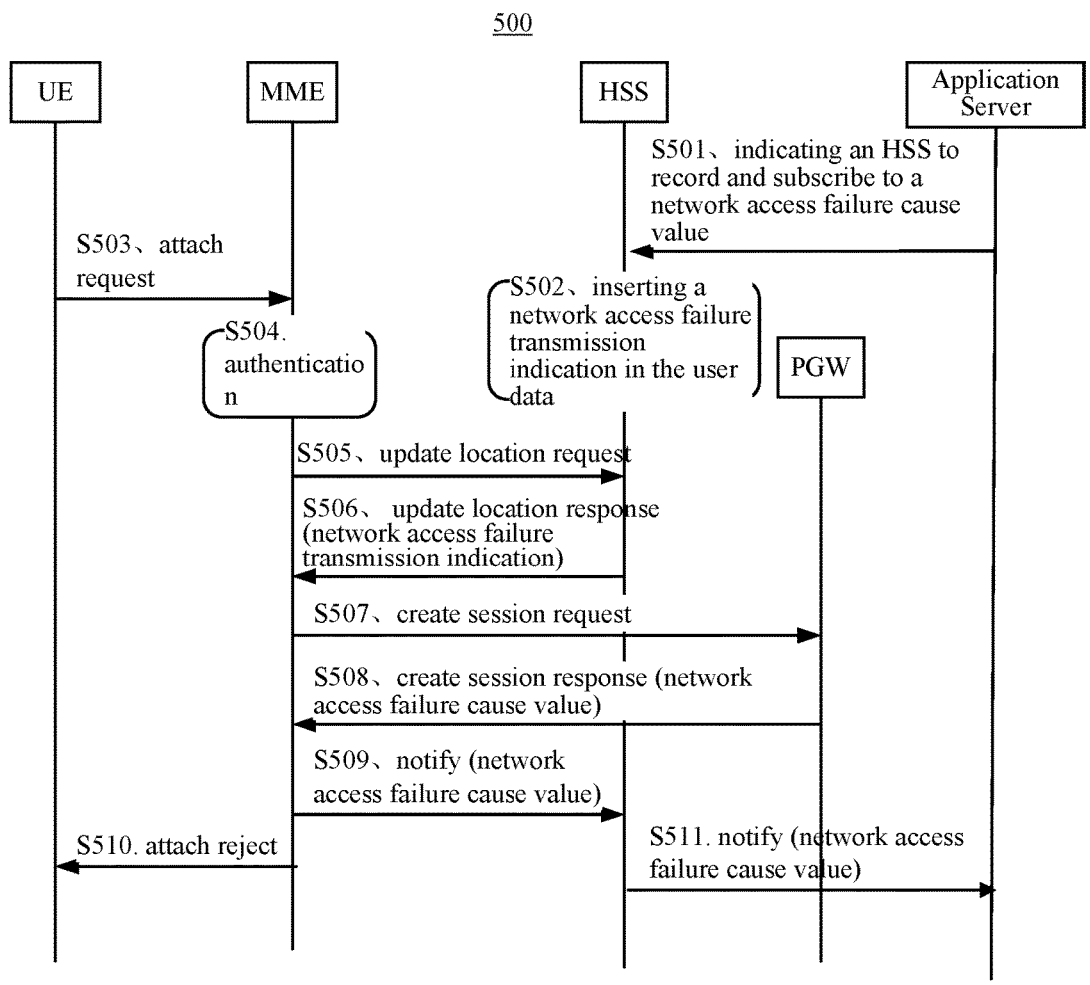
FIG. 6 shows a schematic flowchart of an information processing method according to another embodiment of the present disclosure.

FIG. 6 is a new schematic flowchart of an information processing method 500 according to an embodiment of the present disclosure. As shown in FIG. 6, the method 500 may include:

S501, an application server may indicate an HSS to record the failure cause value of a particular user or a user group by use of an application programming interface (Application Programming Interface, referred to as "API") or by sending an indication information, and subscribe to a network access failure cause value, namely when detecting a network access failure of the user, the HSS needs to actively notify the application server of the network access failure cause value. Wherein, the application server may directly send the indication information to the HSS, and may also forward the indication information through other equipment, for example, may send the indication information to the HSS through an ability opening platform of an operator, an MTC-IWF defined by 3GPP or the like.

S502, the HSS inserts a network access failure transmission indication in the user data.

S503, a user equipment sends an attach request message to an MME.

S504, in the embodiment, since the MME has no user security context, the MME does not need to interact with the HSS at an authentication stage.

S505, after the authentication is completed, the MME sends a update location request to the HSS, to acquire subscribed data of the user equipment.

S506, the HSS sends back a update location response, wherein the update location response message carries the subscribed data of the user equipment and carries the network access failure transmission indication at the same time.

S507, after checking the subscribed data, the MME sends a create session request to a PGW.

S508, the PGW finds that the user is not allowed to be accessed to a packet data network and sends back a create session response, wherein the create session response message carries the network access failure cause value, for example, an APN congestion.

S509, the MME sends a notify message to the HSS, wherein the notify message carries the network access failure cause value.

S510, the MME sends back an attach reject message to UE.

S511, the HSS sends a notify message to the application server, wherein the notify message carries the network access failure cause value, for example, an APN congestion.

Figure 7:
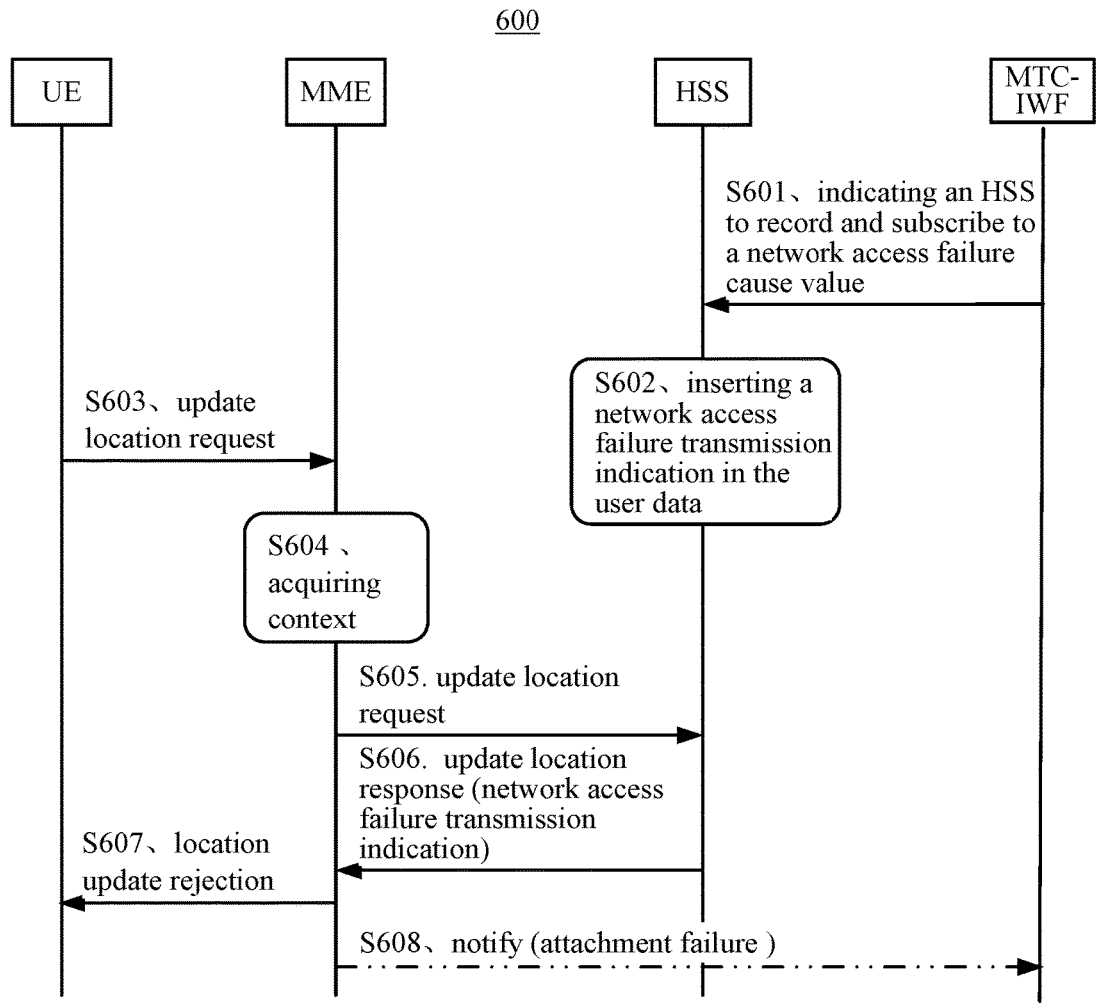
FIG. 7 shows a schematic flowchart of an information processing method according to another embodiment of the present disclosure.

FIG. 7 is a schematic flowchart of an information processing method 600 according to an embodiment of the present disclosure. As shown in FIG. 7, the method 600 may include:

S601, an MTC-IWF proxy application requests an HSS to record a network access failure cause value of a user, and indicates the HSS to report the network access failure cause value to an MTC-IWF; the message may be an existing interface message between the HSS and the MTC-IWF.

S602, the HSS inserts a network access failure transmission indication in user data.

S603, user equipment sends a update location request to an MME due to such causes as location change, overtime of a periodic location update timer and the like; it should be noted that, the update location request is different from an attach request, and the UE has been accessed to a network before sending the update location request.

S604, after receiving the update location request, the MME takes back a context of the user equipment from a source MME of the user equipment, and for simplicity, the source MME of the user equipment is not shown in the figure.

S605, if the context of the user equipment includes no subscribed data, the MME sends the update location request to the HSS, to request the subscribed data of the user equipment.

S606, the HSS sends a update location response to the MME, wherein the update location response carries the subscribed data of the user equipment and the network access failure transmission indication.

It should be understood that, if the context of the user equipment includes the subscribed data, S605 and S606 are not implemented, but the subscribed data have included the network access failure transmission indication, wherein the network access failure transmission indication is sent by the HSS to the source MME of the user equipment when the source MME of the user equipment requests the user data from the HSS.

S607, the MME detects the subscribed data, if finding that the user equipment is not allowed to initiate a location update, sends back a location update rejection to the user equipment, and determines whether a cause why the user equipment is not allowed to initiate the location update belongs to causes resulting in an attachment failure; and when determining that the cause why the user equipment is not allowed to initiate the location update belongs to the causes resulting in the attachment failure, determines the attachment failure of the user equipment.

S608, the MME sends a notify message to the MTC-IWF, wherein the notify message carries a network access failure cause value of the user equipment, for example, the attachment failure and the subscribed data check failure.

Figure 8:
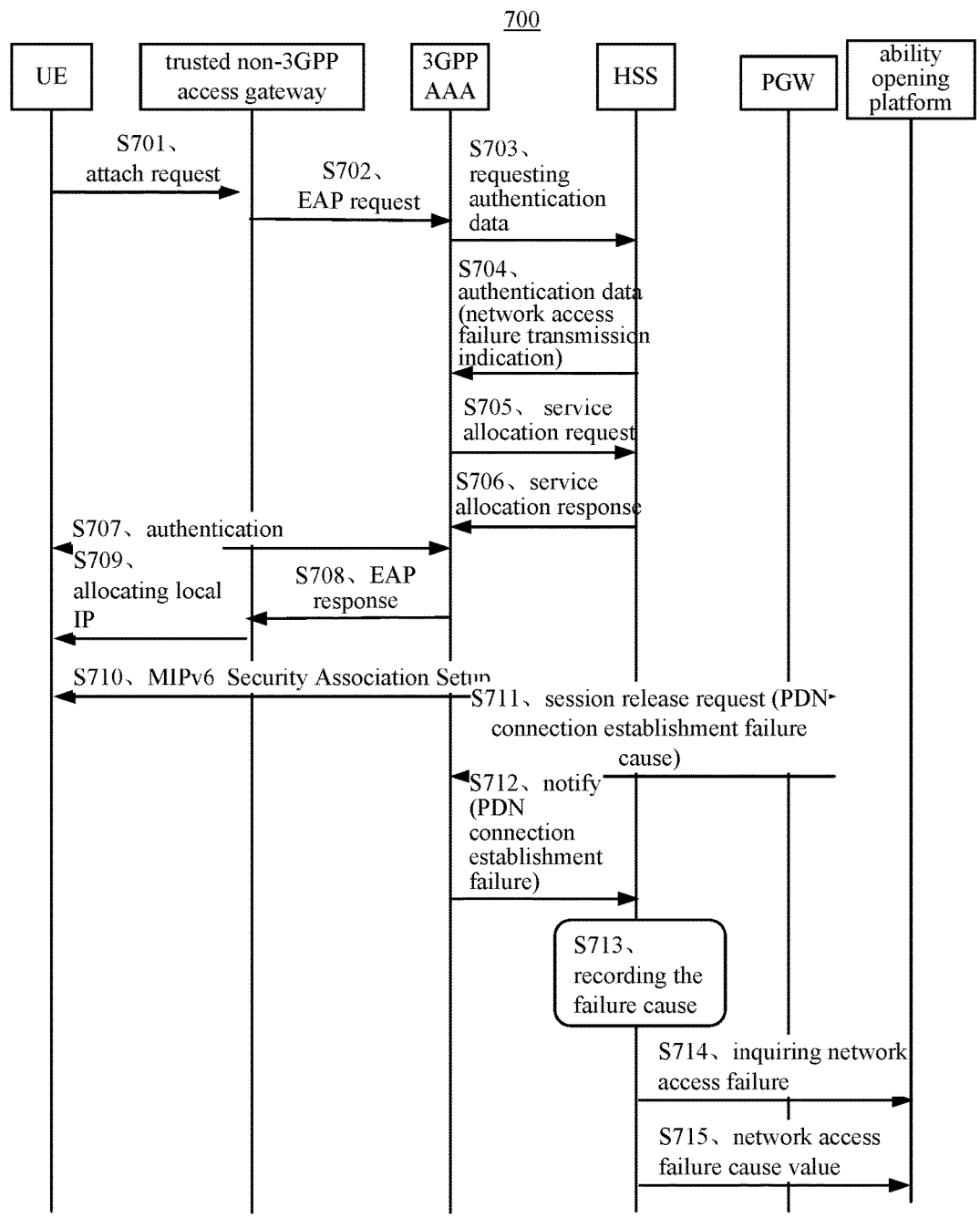
FIG. 8 shows a schematic flowchart of an information processing method according to another embodiment of the present disclosure.

FIG. 8 is a schematic flowchart of an information processing method 700 according to an embodiment of the present disclosure. As shown in FIG. 8, the method 700 includes:

S701, a user equipment sends an attach request to a trusted non-3GPP access gateway.

S702, the non-3GPP access gateway packages the contents of the received attach request in an extensible authentication protocol (Extensible Authentication Protocol, referred to as "EAP") request message and sends the same to a 3GPP AAA.

S703, the 3GPP AAA requests the authentication data from an HSS.

S704, the HSS sends back the authentication data of the user equipment and sends back a network access failure transmission indication at the same time, wherein the network access failure transmission indication may be sent according to subscribed data and may also be sent according to the indication of a failure cause processing entity (an ability opening platform of an operator).

S705, the 3GPP AAA sends a service allocation request to the HSS, to request the subscribed data of the user equipment.

S706, the HSS sends a service allocation response to the 3GPP AAA, wherein the service allocation response includes the subscribed data of the user equipment.

S707, the 3GPP AAA implements the authentication with UE.

S708, the 3GPP AAA sends a diameter EAP response message to the trusted non-3GPP access gateway to indicate authentication success and sends back a corresponding mobile protocol, for example, a dual stack mobile IP version 6 (Dual stack Mobile IP version 6, referred to as "DSMIP") or a proxy Mobile IP version 6 (Proxy Mobile IP version 6, referred to as "PMIP") is selected, and the DSMIP protocol is selected in the embodiment. It should be understood that, if authentication fails or it is found that the user equipment is not allowed to be accessed to the network through a subscribed data check, the 3GPP AAA notifies the HSS of attachment failure according to the network access failure transmission indication.

S709, according to mobile protocol selection sent back by the HSS, the trusted non-3GPP access gateway allocates a local address to the user equipment.

S710, the user equipment performs the internet key change (Internet Key Change, referred to as "IKE") agreement with a PGW by use of the local address, in this process, the PGW will acquire the authentication data from the 3GPP AAA and create a session, and for simplicity, the interaction of the PGW and the AAA is not shown in the figure.

S711, in the case of PDN connection establishment failure, the PGW sends a session release message to the 3GPP AAA, wherein the session release message carries a PDN connection establishment failure cause.

S712, the 3GPP AAA notifies the HSS of the PDN connection establishment failure of the user equipment, wherein the specific cause value may be an APN congestion or an IP address allocation insufficiency.

S713, the HSS records a network access failure cause value, for example, the PDN connection establishment failure, the APN congestion or the IP address allocation insufficiency.

S714, an ability opening platform inquires the network access failure cause value of the user equipment from the HSS.

S715, the HSS sends back the network access failure cause value of the user equipment to the ability opening platform according to the recorded network access failure cause value.

Therefore, the information processing method of the embodiment of the present disclosure may be used for achieving a failure diagnosis of the user equipment, by sending the first message to the first equipment, receiving the second message carrying the network access failure transmission indication and sent by the first equipment according to the first message, and when determining the network access failure of the user equipment, sending the network access failure cause value of the user equipment to the HSS or the failure cause processing entity according to the network access failure transmission indication.

The information processing method according to the embodiment of the present disclosure has been described above in combination with FIG. 1 to FIG. 8. Information processing devices according to the embodiment of the present disclosure, namely an access control network element, an HSS and a failure cause processing entity, will be described below in combination with FIG. 9 to FIG. 18.

Figure 9:
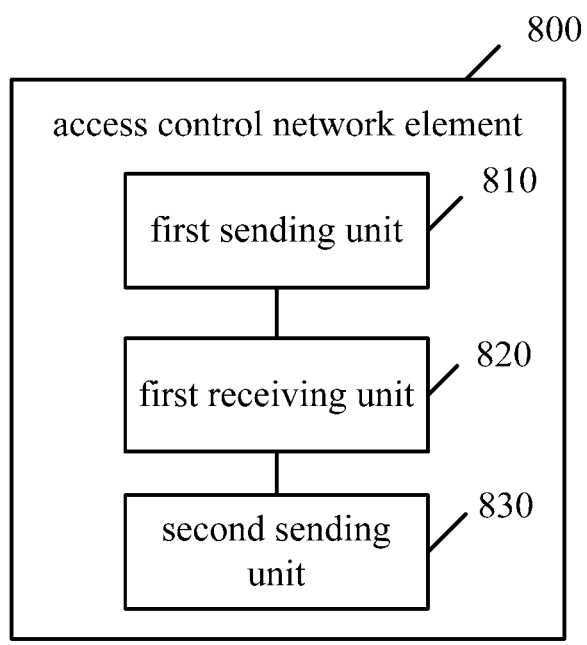
FIG. 9 is a schematic block diagram of an access control network element according to an embodiment of the present disclosure.

FIG. 9 is a schematic block diagram of an access control network element 800 according to an embodiment of the present disclosure. As shown in FIG. 9, the access control network element 800 includes:

a first sending unit 810, configured to send a first message to a first equipment, wherein the first message is used for requesting user data of a user equipment;

a first receiving unit 820, configured to receive a second message sent by the first equipment according to the first message, wherein the second message carries the user data of the user equipment and a network access failure transmission indication;

a second sending unit 830, configured to, when determining a network access failure of the user equipment, send a network access failure cause value of the user equipment to a home subscriber server HSS or a failure cause processing entity according to the network access failure transmission indication.

Optionally, the first equipment is the HSS or a source access control network element of the user equipment; wherein when the first equipment is the source access control network element of the user equipment, the network access transmission indication is sent by the HSS to the source access control network element when the source access control network element requests the user data of the user equipment from the HSS.

Optionally, the network access failure is an attachment failure or a packet data network PDN connection establishment failure.

Figure 10:
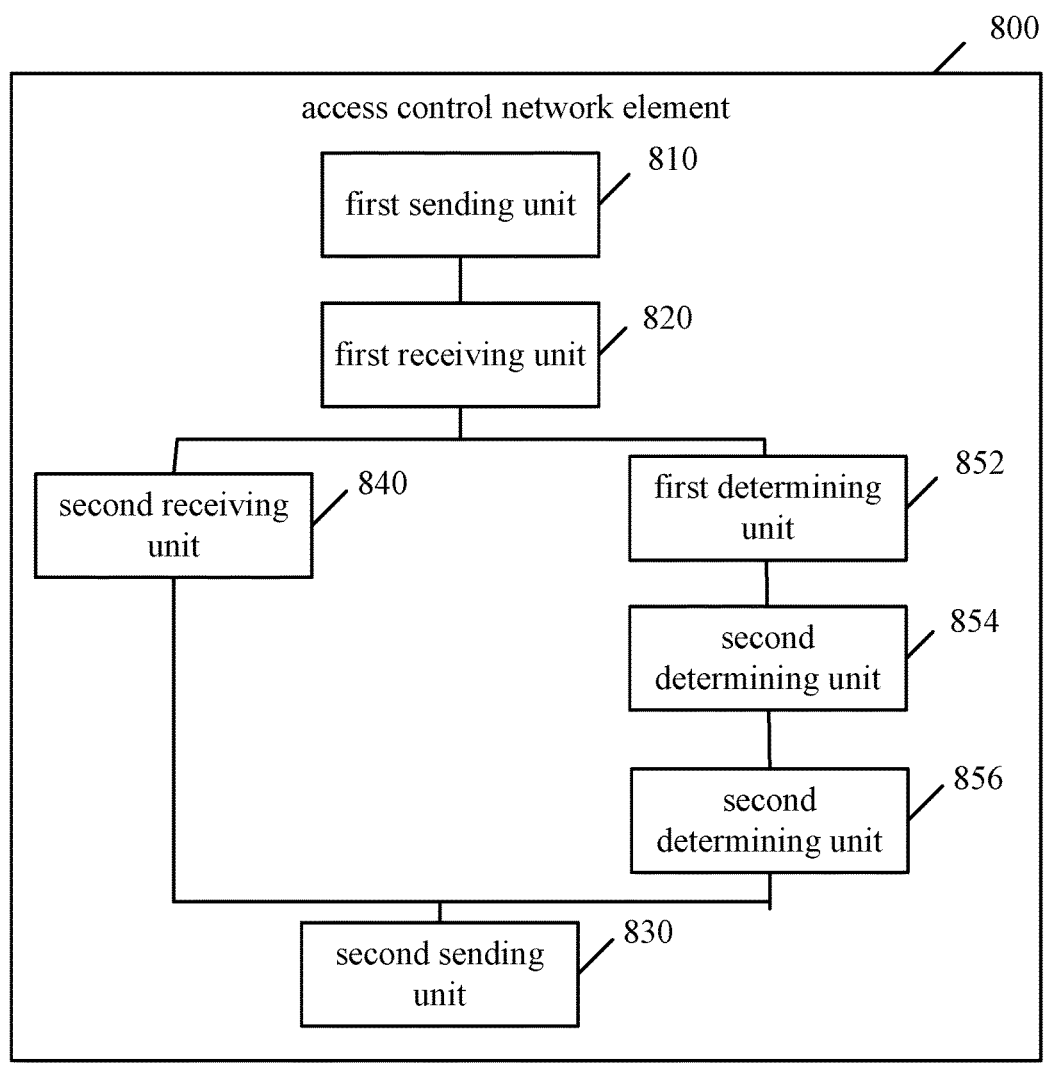
FIG. 10 is a schematic block diagram of an access control network element according to an embodiment of the present disclosure.

Optionally, as shown in FIG. 10, the access control network element 800 further includes:

a second receiving unit 840, configured to receive a third message sent by a packet data gateway, wherein the third message is used for indicating the PDN connection establishment failure of the user equipment, and the third message carries the network access failure cause value.

Optionally, the access control network element 800 further includes:

a first determining unit 852, configured to determine whether the user equipment is allowed to complete a location update according to the user data;

a second determining unit 854, configured to, when determining that the user equipment is not allowed to complete the location update, determine whether a cause why the user equipment is not allowed to complete the location update belongs to causes resulting in an attachment failure;

a third determining unit 856, configured to, when determining that the cause why the user equipment is not allowed to complete the location update belongs to the causes resulting in the attachment failure, determine the attachment failure of the user equipment.

Optionally, the failure cause processing entity is an application server, an ability opening platform of an operator or a machine type communications-interworking function MTC-IWF.

Optionally, the access control network element 900 is an MME, an SGSN or an AAA.

Therefore, the access control network element of the embodiment of the present disclosure may be used for achieving a failure diagnosis of the user equipment, by receiving the first message sent by the access control network element of the user equipment, and sending the second message carrying the network access failure transmission indication, for enabling the access control network element of the user equipment to send the network access failure cause value of the user equipment to the HSS or the failure cause processing entity when determining the network access failure of the user equipment.

Figure 11:
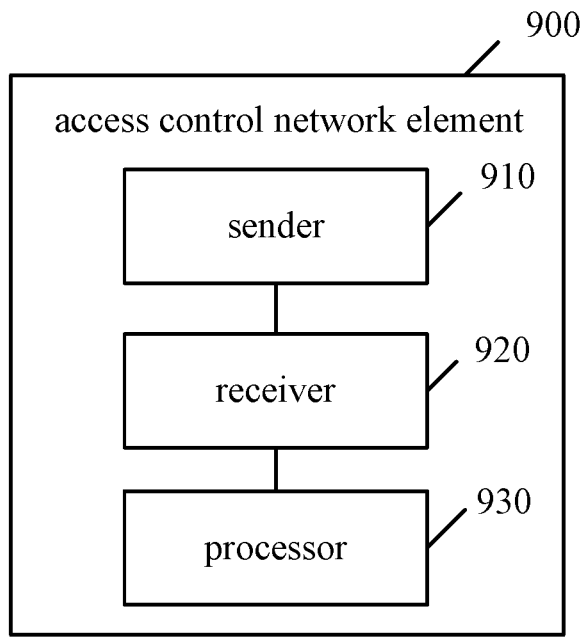
FIG. 11 is a schematic block diagram of an access control network element according to an embodiment of the present disclosure.

FIG. 11 is a schematic block diagram of an access control network element 900 according to an embodiment of the present disclosure. As shown in FIG. 11, the access control network element 900 includes:

a sender 910, configured to send a first message to a first equipment, wherein the first message is used for requesting user data of a user equipment;

a receiver 920, configured to receive a second message sent by the first equipment according to the first message, wherein the second message carries the user data of the user equipment and a network access failure transmission indication;

a processor 930, configured to, determine whether the user equipment is subjected to a network access failure;

the sender 930 is further configured to, when the processor determines the network access failure of the user equipment, send a network access failure cause value of the user equipment to a home subscriber server HSS or a failure cause processing entity according to the network access failure transmission indication.

Optionally, the first equipment is the HSS or a source access control network element of the user equipment; wherein when the first equipment is the source access control network element of the user equipment, the network access transmission indication is sent by the HSS to the source access control network element when the source access control network element requests user data of the user equipment from the HSS.

Optionally, the network access failure is an attachment failure or a packet data network PDN connection establishment failure.

Optionally, the receiver 920 is further configured to receive a third message sent by a packet data gateway, wherein the third message is used for indicating the PDN connection establishment failure of the user equipment, and the third message carries the network access failure cause value; the processor 930 is specifically configured to determine whether the user equipment is subjected to the network access failure according to the third message received by the receiver 920.

Optionally, the processor 930 is specifically configured to determine whether the user equipment is allowed to complete a location update according to the user data;

when determining that the user equipment is not allowed to complete the location update, determine whether a cause why the user equipment is not allowed to complete the location update belongs to causes resulting in an attachment failure; and when determining that the cause why the user equipment is not allowed to complete the location update belongs to the causes resulting in the attachment failure, determine the attachment failure of the user equipment.

Optionally, the failure cause processing entity is an application server, an ability opening platform of an operator or an MTC-IWF.

Optionally, the access control network element 900 is an MME, an SGSN or an AAA.

Therefore, the access control network element of the embodiment of the present disclosure may be used for achieving a failure diagnosis of the user equipment, by receiving the first message sent by the access control network element of the user equipment, and sending the second message carrying the network access failure transmission indication, for enabling the access control network element of the user equipment to send the network access failure cause value of the user equipment to the HSS or the failure cause processing entity when determining the network access failure of the user equipment.

Figure 12:
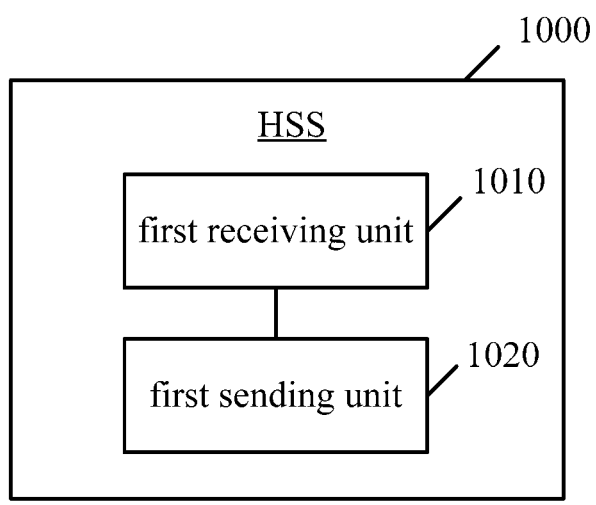
FIG. 12 is a schematic block diagram of a home subscriber server according to an embodiment of the present disclosure.

FIG. 12 is a schematic block diagram of an HSS according to an embodiment of the present disclosure. As shown in FIG. 12, the HSS 1000 includes:

a first receiving unit 1010, configured to receive a first message sent by an access control network element of a user equipment, wherein the first message is used for requesting user data of the user equipment;

a first sending unit 1020, configured to send a second message to the access control network element of the user equipment according to the first message, wherein the second message carries the user data of the user equipment and a network access failure transmission indication, for enabling the access control network element of the user equipment to send a network access failure cause value of the user equipment to the home subscriber server HSS or a failure cause processing entity when determining a network access failure of the user equipment.

Figure 13:
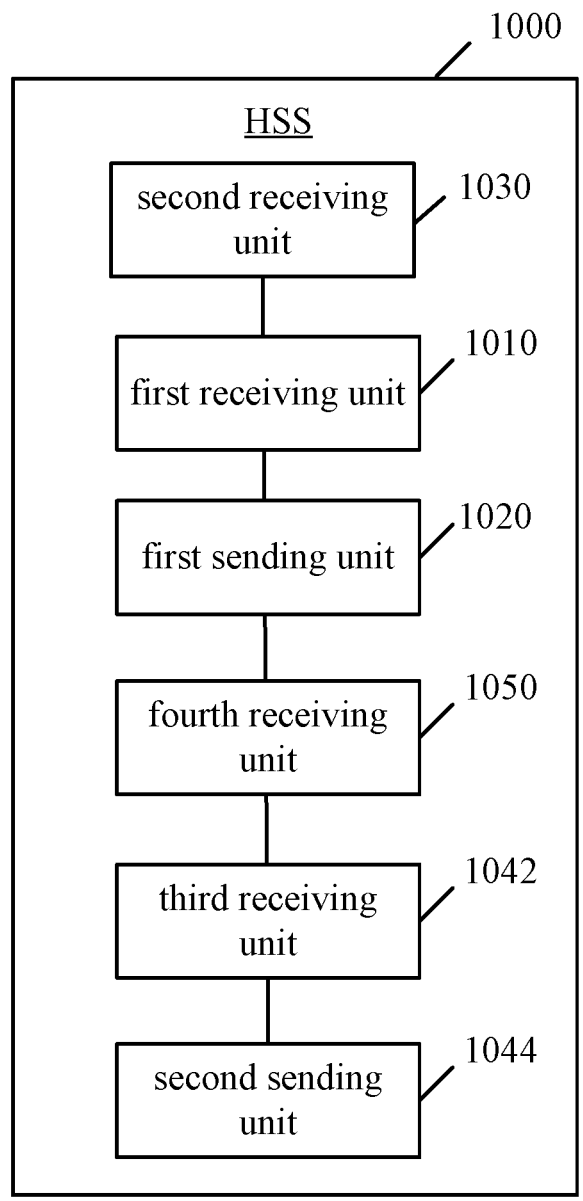
FIG. 13 is a schematic block diagram of a home subscriber server according to another embodiment of the present disclosure.

Optionally, as shown in FIG. 13, the HSS 1000 further includes:

a second receiving unit 1030, configured to receive an indication information sent by the failure cause processing entity, wherein the indication information is used for indicating to send the network access failure transmission indication to the access control network element of the user equipment.

Optionally, as shown in FIG. 13, the HSS 1000 further includes:

a third receiving unit 1042, configured to receive the network access failure cause value of the user equipment, sent by the access control network element of the user equipment;

a second sending unit 1044, configured to send the network access failure cause value of the user equipment to the failure cause processing entity.

Optionally, as shown in FIG. 13, the HSS 1000 further includes a fourth receiving unit 1050, configured to receive an inquiry request sent by the failure cause processing entity, wherein the inquiry request is used for requesting to inquire the network access failure cause value of the user equipment, and the second sending unit 1044 is specifically configured to send the network access failure cause value of the user equipment to the failure cause processing entity according to the inquiry request; or, when the HSS further includes the second receiving unit 1030 configured to receive the indication information sent by the failure cause processing entity and used for indicating to send the network access failure transmission indication to the access control network element of the user equipment, the second sending unit 1044 is specifically configured to send the network access failure cause value of the user equipment to the failure cause processing entity according to the indication information, wherein the indication information is further used for indicating to send the network access failure cause value of the user equipment to the failure cause processing entity when receiving the network access failure cause value of the user equipment.

Optionally, an access control entity of the user equipment is a mobility management entity MME, a serving general packet radio service support node SGSN or an authentication, authorization and accounting AAA; the failure cause processing entity is an application server, an ability opening platform of an operator or a machine type communications-interworking function MTC-IWF.

Therefore, the HSS of the embodiment of the present disclosure may be used for achieving a failure diagnosis of the user equipment, by receiving the first message sent by the access control network element of the user equipment, and sending the second message carrying the network access failure transmission indication, for enabling the access control network element of the user equipment to send the network access failure cause value of the user equipment to the HSS or the failure cause processing entity when determining the network access failure of the user equipment.

Figure 14:
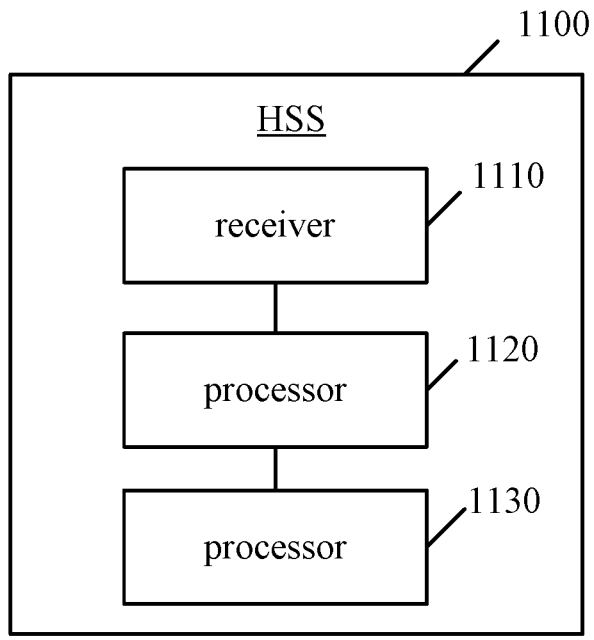
FIG. 14 is a schematic block diagram of a home subscriber server according to another embodiment of the present disclosure.

FIG. 14 is a schematic block diagram of an HSS 1100 according to an embodiment of the present disclosure. As shown in FIG. 12, the HSS 1100 includes:

a receiver 1110, configured to receive a first message sent by an access control network element of a user equipment, wherein the first message is used for requesting user data of the user equipment;

a processor 1120, configured to determine that a network access failure transmission indication needs to be sent to the access control network element of the user equipment;

a sender 1130, configured to send a second message to the access control network element of the user equipment, wherein the second message carries the user data of the user equipment and a network access failure transmission indication, for enabling the access control network element of the user equipment to send a network access failure cause value of the user equipment to the home subscriber server HSS or a failure cause processing entity when determining a network access failure of the user equipment.

Optionally, the receiver 1110 is further configured to receive an indication information sent by the failure cause processing entity, wherein the indication information is used for indicating to send the network access failure transmission indication to the access control network element of the user equipment.

Optionally, the receiver 1110 is further configured to receive the network access failure cause value of the user equipment, sent by the access control network element of the user equipment;

the processor 1120 is further configured to determine that the network access failure cause value needs to be sent to the failure cause processing entity;

the sender 1130 is further configured to send the network access failure cause value of the user equipment to the failure cause processing entity.

Optionally, the receiver 1110 is further configured to receive an inquiry request sent by the failure cause processing entity, wherein the inquiry request is used for requesting to inquire the network access failure cause value of the user equipment, and the processor 1120 is specifically configured to determine that the network access failure cause value needs to be sent to the failure cause processing entity according to the inquiry request; or, when the receiver 1110 is further configured to receive the indication information sent by the failure cause processing entity and used for indicating to send the network access failure transmission indication to the access control network element of the user equipment, the processor 1120 is specifically configured to determine that the network access failure cause value needs to be sent to the failure cause processing entity according to the indication information, wherein the indication information is further used for indicating to send the network access failure cause value of the user equipment to the failure cause processing entity when receiving the network access failure cause value of the user equipment.

Optionally, an access control entity of the user equipment is an MME, an SGSN or an AAA; the failure cause processing entity is an application server, an ability opening platform of an operator or an MTC-IWF.

Therefore, the HSS of the embodiment of the present disclosure may be used for achieving a failure diagnosis of the user equipment, by receiving the first message sent by the access control network element of the user equipment, and sending the second message carrying the network access failure transmission indication, for enabling the access control network element of the user equipment to send the network access failure cause value of the user equipment to the HSS or the failure cause processing entity when determining the network access failure of the user equipment.

Figure 15:
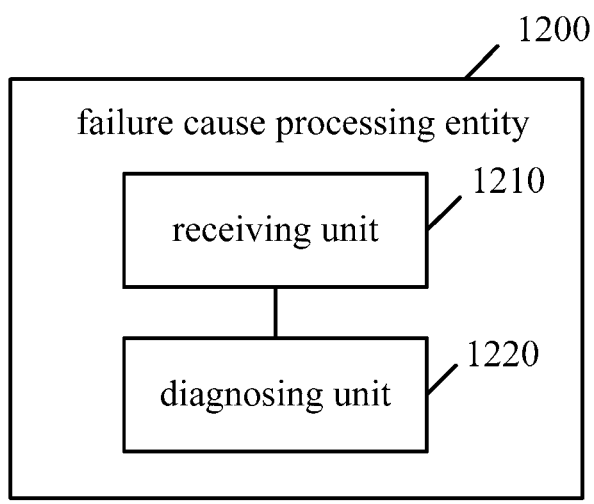
FIG. 15 is a schematic block diagram of a failure cause processing entity according to an embodiment of the present disclosure.

FIG. 15 is a schematic block diagram of a failure cause processing entity 1200 according to an embodiment of the present disclosure. As shown in FIG. 15, the failure cause processing entity 1200 includes:

a receiving unit 1210, configured to receive a network access failure cause value of a user equipment sent by a home subscriber server HSS or an access control network element of the user equipment;

a diagnosing unit 1220, configured to diagnose a failure of the user equipment according to the network access failure cause value of the user equipment.

Figure 16:
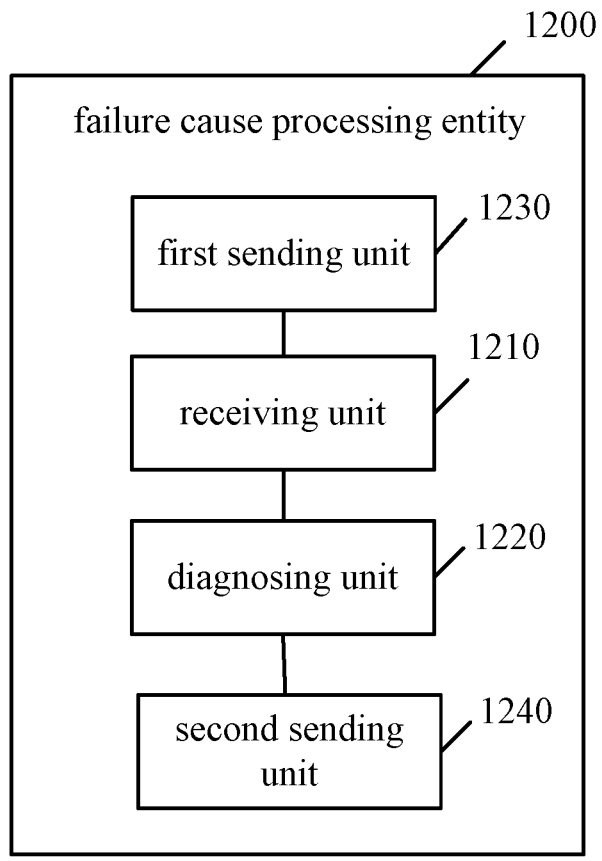
FIG. 16 is a schematic block diagram of a failure cause processing entity according to another embodiment of the present disclosure.

Optionally, as shown in FIG. 16, the failure cause processing entity 1200 further includes:

a first sending unit 1230, configured to send an indication information to the HSS, wherein the indication information is used for indicating the HSS to send the network access failure transmission indication corresponding to the user equipment to the access control network element of the user equipment, for enabling the access control network element of the user equipment to send the network access failure cause value of the user equipment to the HSS or the failure cause processing entity when determining a network access failure of the user equipment.

Optionally, the indication information is further used for indicating the HSS to send the network access failure cause value of the user equipment to the failure cause processing entity when receiving the network access failure cause value of the user equipment.

Optionally, as shown in FIG. 16, the failure cause processing entity 1200 further includes:

a second sending unit 1240, configured to send an inquiry request to the HSS, wherein the inquiry request is used for requesting to inquire the network access failure cause value of the user equipment.

Optionally, the network access failure is an attachment failure or a packet data network PDN connection establishment failure.

Optionally, an access control entirety of the user equipment is an MME, an SGSN or an AAA; the failure cause processing entity is an application server, an ability opening platform of an operator or an MTC-IWF.

Therefore, the failure cause processing entity of the embodiment of the present disclosure may be used for achieving a failure diagnosis of the user equipment, by receiving the network access failure cause value of the user equipment sent by the home subscriber server HSS and the access control network element of the user equipment, and diagnosing a failure of the user equipment according to the network access failure cause value of the user equipment.

Figure 17:
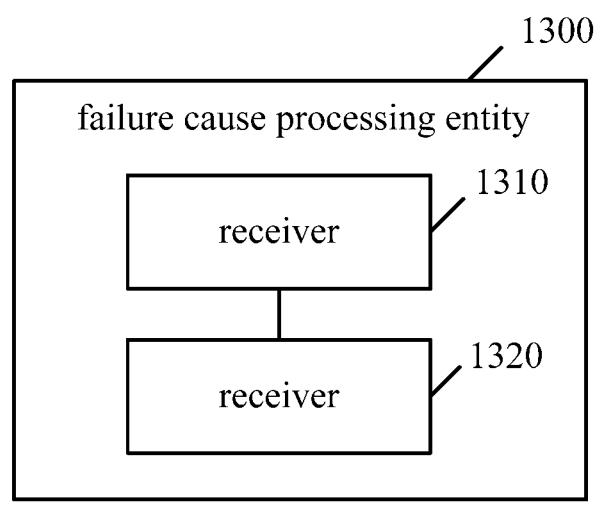
FIG. 17 is a schematic block diagram of a failure cause processing entity according to another embodiment of the present disclosure.

FIG. 17 is a schematic block diagram of a failure cause processing entity 1300 according to an embodiment of the present disclosure. As shown in FIG. 17, the failure cause processing entity 1300 includes:

a receiver 1310, configured to receive a network access failure cause value of a user equipment sent by a home subscriber server HSS or an access control network element of the user equipment;

a processor 1320, configured to diagnose a failure of the user equipment according to the network access failure cause value of the user equipment.

Figure 18:
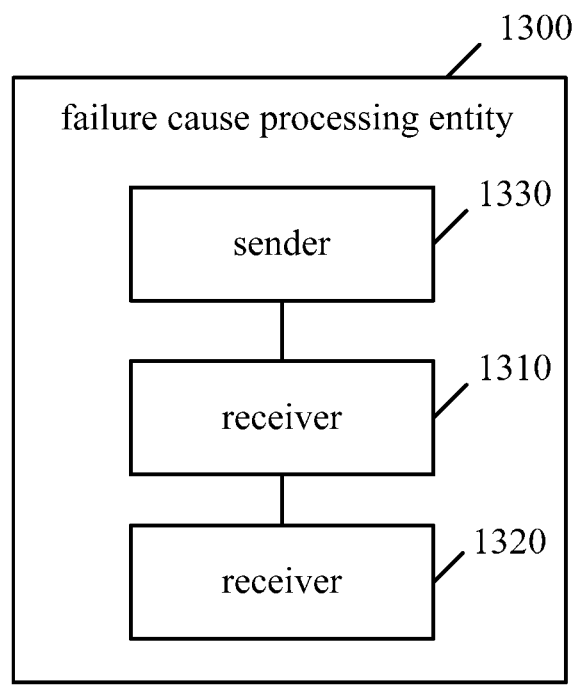
FIG. 18 is a schematic diagram of a block of a failure cause processing entity according to another embodiment of the present disclosure.

Optionally, as shown in FIG. 18, the failure cause processing entity 1300 further includes:

a sender 1330, configured to send an indication information to the HSS, wherein the indication information is used for indicating the HSS to send the network access failure transmission indication corresponding to the user equipment to the access control network element of the user equipment, for enabling the access control network element of the user equipment to send the network access failure cause value of the user equipment to the HSS or the failure cause processing entity when determining a network access failure of the user equipment.

Optionally, the indication information is further used for indicating the HSS to send the network access failure cause value of the user equipment to the failure cause processing entity when receiving the network access failure cause value of the user equipment.

Optionally, as shown in FIG. 18, the failure cause processing entity 1300 further includes:

a sender 1330, configured to send an inquiry request to the HSS, wherein the inquiry request is used for requesting to inquire the network access failure cause value of the user equipment.

Optionally, the network access failure is an attachment failure or a packet data network PDN connection establishment failure.

Optionally, an access control entirety of the user equipment is an MME, an SGSN or an AAA; the failure cause processing entity is an application server, an ability opening platform of an operator or an MTC-IWF.

Therefore, the failure cause processing entity of the embodiment of the present disclosure may be used for achieving a failure diagnosis of the user equipment, by receiving the network access failure cause value of the user equipment sent by the home subscriber server HSS and the access control network element of the user equipment, and diagnosing the failure of the user equipment according to the network access failure cause value of the user equipment.

Those of ordinary skill in the art may be aware that, units and algorithm steps of the examples described in the embodiments disclosed in this paper may be implemented by electronic hardware or a combination of computer software and the electronic hardware. Whether these functions are implemented in the form of hardware or software depends on specific applications and design constraint conditions of the technical solutions. Those skilled may implement the described functions by using different methods for each specific application, but this implementation should not be considered beyond the scope of the present disclosure.

Those skilled in the art to which the present disclosure pertains may clearly understand that, for convenience and simplicity of description, the specific working processes of the system, apparatus and units described above may refer to corresponding processes in the foregoing method embodiments, and will not be repeated redundantly herein.

In the several embodiments provided in the present application, it should be understood that, the disclosed system, apparatus and method may be implemented in other manners. For example, the apparatus embodiments described above are merely exemplary, e.g., the division of the units is only a logic function division, other division manners may exist in practical implementation, for example, a plurality of units or components may be combined or integrated to another system, or some features may be omitted or not implemented. From another point of view, the displayed or discussed mutual coupling or direct coupling or communication connection may be indirect coupling or communication connection of devices or units through some interfaces, and may be in electrical, mechanical or other forms.

The units described as separate components may be separated physically or not, components displayed as units may be physical units or not, namely, may be located in one place, or may be distributed on a plurality of network units. A part of or all of the units may be selected to achieve the purposes of the solutions in the embodiments according to actual demand.

In addition, the functional units in the embodiments of the present disclosure may be integrated in a processing unit, or the units singly exist physically, or two or more units are integrated in one unit.

If the function is implemented in the form of a software functional unit and is sold or used as an independent product, it may be stored in a computer readable storage medium. Based on this understanding, the technical solutions of the present disclosure substantially, or the part contributing to the prior art, or a part of the technical solutions may be implemented in the form of a software product, the computer software product is stored in a storage medium, and includes a plurality of instructions enabling computer equipment (may be a personnel computer, a server, or network equipment, etc.) to execute all or a part of the steps of the methods in the embodiments of the present disclosure. The foregoing storage medium includes a variety of media capable of storing program codes, such as a USB disk, a mobile hard disk, a read-only memory (ROM, Read-Only Memory), a random access memory (RAM, Random Access Memory), a magnetic disk, an optical disk or the like.

The foregoing descriptions are merely specific implementations of the present disclosure, rather than limiting the protection scope of the present disclosure. Any skilled one who is familiar with this art could readily think of variations or substitutions within the disclosed technical scope of the present disclosure, and these variations or substitutions shall fall within the protection scope of the present disclosure. Accordingly, the protection scope of the claims should prevail over the protection scope of the present disclosure.

What is claimed is:

1. An information processing method, comprising:
sending a first message to a first equipment, wherein the first message is used for requesting user data of a user equipment;
receiving a second message from the first equipment according to the first message, wherein the second message carries the user data of the user equipment and a network access failure transmission indication;
determining whether there is a network access failure of the user equipment; and
if the network access failure of the user equipment exists, sending a network access failure cause value of the user equipment according to the network access failure transmission indication to one of a storing user subscribed information entity and a failure cause processing entity.

2. The method according to claim 1, wherein the first equipment is the storing user subscribed information entity or a source access control network element of the user equipment; and wherein when the first equipment is the source access control network element of the user equipment, the network access failure transmission indication is sent by the storing user subscribed information entity to the source access control network element when the source access control network element requests the user data of the user equipment from the storing user subscribed information entity.

3. The method according to claim 1, wherein the network access failure is an attachment failure or a packet data network (PDN) connection establishment failure.

4. The method according to claim 3, wherein before sending the network access failure cause value of the user equipment to the storing user subscribed information entity or the failure cause processing entity, the method further comprises:

receiving a third message from a packet data gateway, wherein the third message is used for indicating the PDN connection establishment failure of the user equipment, and the third message carries the network access failure cause value.

5. The method according to claim 3, wherein when the first equipment is a source access control network element of the user equipment, before sending the network access failure cause value of the user equipment to the storing user subscribed information entity or the failure cause processing entity, the method further comprises:

determining whether the user equipment is allowed to complete a location update according to the user data;
when determining that the user equipment is not allowed to complete the location update, determining whether a cause that the user equipment is not allowed to complete the location update also results in the attachment failure; and
when determining that the cause also results in the attachment failure, determining the attachment failure of the user equipment.

6. An information processing method, comprising:
receiving a first message from an access control network element of a user equipment, wherein the first message is used for requesting user data of the user equipment; and
sending a second message to the access control network element of the user equipment according to the first message, wherein the second message carries the user data of the user equipment and a network access failure transmission indication, for enabling the access control network element of the user equipment to send a network access failure cause value of the user equipment to a storing user subscribed information entity or a failure cause processing entity when determining a network access failure of the user equipment.

7. The method according to claim 6, wherein before receiving the first message from the access control network element of the user equipment, the method further comprises:

receiving indication information from the failure cause processing entity, wherein the indication information is used for indicating to send the network access failure transmission indication to the access control network element of the user equipment.

8. The method according to claim 6, further comprising:
receiving the network access failure cause value of the user equipment, from the access control network element of the user equipment; and
sending the network access failure cause value of the user equipment to the failure cause processing entity.

9. The method according to claim 8, wherein the sending the network access failure cause value of the user equipment to the failure cause processing entity, comprises:

receiving an inquiry request from the failure cause processing entity, wherein the inquiry request is used for requesting to inquire the network access failure cause value of the user equipment, and sending the network access failure cause value of the user equipment to the failure cause processing entity according to the inquiry request; or wherein when indication information is received which is sent by the failure cause processing entity, the sending the network access failure cause value of the user equipment to the failure cause processing entity comprises:

sending the network access failure cause value of the user equipment to the failure cause processing entity according to the indication information, wherein the indication information is further used for indicating to send the network access failure cause value of the user equipment to the failure cause processing entity when receiving the network access failure cause value of the user equipment.

10. The method according to claim 6, wherein an access control entity of the user equipment is a mobility management entity (MME), a serving general packet radio service support node (SGSN) or an authentication, authorization and accounting (AAA); the failure cause processing entity is an application server, an ability opening platform of an operator or, a machine type communications-interworking function (MTC-IWF).

11. An access control network element, comprising:
a processor; and
a memory, coupled to the processor and storing processor-readable instructions which when executed causes the processor to implement operations including:
sending a first message to a first equipment, wherein the first message is used for requesting user data of a user equipment;
receiving a second message from the first equipment according to the first message, wherein the second message carries the user data of the user equipment and a network access failure transmission indication;
determining whether there is a network access failure of the user equipment; and
if the network access failure of the user equipment exists, sending a network access failure cause value of the user equipment to a storing user subscribed information entity or a failure cause processing entity according to the network access failure transmission indication.

12. The access control network element according to claim 11, wherein the first equipment is the storing user subscribed information entity or a source access control network element of the user equipment; and wherein when the first equipment is the source access control network element of the user equipment, the network access failure transmission indication is sent by the storing user subscribed information entity to the source access control network element when the source access control network element requests the user data of the user equipment from the storing user subscribed information entity.

13. The access control network element according to claim 11, wherein the network access failure is an attachment failure or a packet data network (PDN) connection establishment failure.

14. The access control network element according to claim 13, wherein the operations further comprise:
receiving a third message from a packet data gateway, wherein the third message is used for indicating the PDN connection establishment failure of the user equipment, and the third message carries the network access failure cause value.

15. The access control network element according to claim 13, wherein the operations further comprise:
determining whether the user equipment is allowed to complete a location update according to the user data;
when determining that the user equipment is not allowed to complete the location update, determining whether a cause that the user equipment is not allowed to complete the location update also results in the attachment failure; and
when determining that the cause also results in the attachment failure, determining the attachment failure of the user equipment.

16. A storing user subscribed information entity, comprising:
a processor; and
a memory, coupled to the processor and storing processor-readable instructions which when executed causes the processor to implement operations including:
receiving a first message from an access control network element of a user equipment, wherein the first message is used for requesting user data of the user equipment; and
sending a second message to the access control network element of the user equipment according to the first message, wherein the second message carries the user data of the user equipment and a network access failure transmission indication, for enabling the access control network element of the user equipment to send a network access failure cause value of the user equipment to the storing user subscribed information entity or a failure cause processing entity when determining a network access failure of the user equipment.

17. The storing user subscribed information entity according to claim 16, wherein the operations further comprise:
receiving indication information from the failure cause processing entity, wherein the indication information is used for indicating to send the network access failure transmission indication to the access control network element of the user equipment.

18. The storing user subscribed information entity according to claim 16, wherein the operations further comprise:
receiving the network access failure cause value of the user equipment, from the access control network element of the user equipment; and
sending the network access failure cause value of the user equipment to the failure cause processing entity.

19. The storing user subscribed information entity according to claim 16, wherein the operations further comprise:
receiving an inquiry request from the failure cause processing entity, wherein the inquiry request is used for requesting to inquire the network access failure cause value of the user equipment, and sending the network access failure cause value of the user equipment to the failure cause processing entity according to the inquiry request; or
wherein when the indication information is received which is sent by the failure cause processing entity and used for indicating to send the network access failure transmission indication to the access control network element of the user equipment, the operations further comprise: sending the network access failure cause value of the user equipment to the failure cause processing entity according to the indication information, wherein the indication information is further used for indicating to send the network access failure cause value of the user equipment to the failure cause processing entity when receiving the network access failure cause value of the user equipment.

20. The storing user subscribed information entity according to claim 16, wherein an access control entity of the user equipment is a mobility management entity (MME), a serving general packet radio service support node (SGSN) or an authentication, authorization and accounting (AAA); the failure cause processing entity is an application server, an ability opening platform of an operator, or a machine type communications-interworking function (MTC-IWF).

21. An information processing method, wherein the method comprises:
sending, by an access control network element of a user equipment, a first message to a first equipment, wherein the first message is used for requesting user data of the user equipment;
receiving, by the first equipment, the first message from the access control network element of the user equipment;
sending, by the first equipment, a second message to the access control network element of the user equipment according to the first message, wherein the second message carries the user data of the user equipment and a network access failure transmission indication;
receiving, by the access control network element of the user equipment, the second message from the first equipment;
determining, by the access control network element of the user equipment, whether there is a network access failure of the user equipment; and
if the network access failure of the user equipment exists, sending, by the access control network element of the user equipment, a network access failure cause value of the user equipment according to the network access failure transmission indication to one of a storing user subscribed information entity and a failure cause processing entity.

22. An information processing system, comprising an access control network element of a user equipment and a storing user subscribed information entity,
wherein the access control network element of the user equipment is configured to:
send a first message to the storing user subscribed information entity, wherein the first message is used for requesting user data of the user equipment;
receive a second message from the storing user subscribed information entity, wherein the second message carries the user data of the user equipment and a network access failure transmission indication;
determine whether there is a network access failure of the user equipment; and
if the network access failure of the user equipment exists, send a network access failure cause value of the user equipment according to the network access failure transmission indication to one of the storing user subscribed information entity and a failure cause processing entity;

wherein the storing user subscribed information entity is configured to:

receive the first message from the access control network element of the user equipment, and send the second message to the access control network element of the user equipment according to the first message.

* * * * *